United States Patent [19]

Fodale et al.

[11] Patent Number: 4,896,533

[45] Date of Patent: Jan. 30, 1990

[54] MINIATURIZATION OF FLIGHT DEFLECTION MEASUREMENT SYSTEM

[75] Inventors: Robert Fodale, Massapequa; Herbert R. Hampton, Hauppauge, both of N.Y.

[73] Assignee: The United States of America as represented by the Administrator of the National Aeronautics and Space Administration, Washington, D.C.

[21] Appl. No.: 251,438

[22] Filed: Sep. 30, 1988

[51] Int. Cl.$^4$ .............................................. G01M 9/00
[52] U.S. Cl. .................................. 73/147; 340/825.69
[58] Field of Search ................. 73/147, 583, 655, 773, 73/866.4

[56] References Cited

U.S. PATENT DOCUMENTS

| | | |
|---|---|---|
| 3,671,812 | 6/1972 | Peluso et al. . |
| 3,725,744 | 4/1973 | Reed . |
| 4,136,568 | 1/1979 | Seymour . |
| 4,390,877 | 6/1983 | Curran . |
| 4,423,468 | 12/1983 | Gatto et al. ..................... 361/396 X |
| 4,426,637 | 1/1984 | Apple et al. . |
| 4,485,382 | 11/1984 | Moore . |
| 4,488,094 | 12/1984 | Min et al. . |
| 4,514,784 | 4/1985 | Williams et al. ................ 361/396 X |
| 4,584,504 | 4/1986 | Lee et al. . |
| 4,733,215 | 3/1988 | Memmola ................. 340/825.72 X |

Primary Examiner—Charles A. Ruehl
Attorney, Agent, or Firm—George F. Helfrich; John R. Manning; Charles E. B. Glenn

[57] ABSTRACT

A flight deflection measurement system including a hybrid microchip of a receiver/decoder. The hybrid microchip decoder is mounted piggyback on the miniaturized receiver and forms an integral unit therewith. The flight deflection measurement system employing the miniaturized receiver/decoder can be used in a wind tunnel. In particular, the miniaturized receiver/decoder can be employed in a spin measurement system due to its small size and can retain already established control surface actuation functions.

3 Claims, 2 Drawing Sheets

MINIATURIZATION OF FLIGHT DEFLECTION MEASUREMENT SYSTEM

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

CROSS-REFERENCE TO RELATED APPLICATION

This application is cross-referenced to U.S. Ser. No. 97/251,411 filed Sept. 30, 1988, Robert Fodale et al., and entitled "Electro-Optical Spin Measurement System."

BACKGROUND OF THE INVENTION

1. Field of the Invention

The present invention is directed to a miniaturization of a receiver/decoder for use in, for example, a flight deflection measurement system. An optical flight deflection measurement system is able to measure deflection or movement of an aircraft wing relative to the fuselage of the aircraft. This is done by employing, for example, light emitting diodes (LED's) as targets on the wing surface and receivers mounted on the fuselage.

When applying this technology to a spin measurement system (SMS), a radio control system must be added so that a wireless communication link is established between a free spinning model within a wind tunnel proper, receivers and a control unit mounted about the periphery of the wind tunnel. The spin model must then act as the container for not only the LEDs, but must also house a receiver/decoder which will provide the necessary control and sequencing commands required by the spin model. Because of the small volume available for the mounting of components in the spin model, the decoder components are micro-miniaturized and mounted on the receiver to form a single integral unit. This unit is then mounted on the spin model. The micro-miniaturized components are able to perform in a spin measurement system (SMS), and also retain a previously established control surface actuation function.

2. Description of the Related Art

Optical flight deflection measurement systems (FDMS) have been developed which are able to measure deflection or movement of aircraft wings relative to the fuselage in a spin tunnel environment. Optical systems must be employed in order to preserve a model's ability to spin freely within the confines of a wind tunnel. For example, U.S. Pat. No. 4,136,568 teaches an electro-optical sensor for retaining accuracy and reliability of a target tracking system. Prior art FDMS employ constant current target drive assemblies hard wired to targets (LEDs). This provides a disadvantage that, in a spin measurement system, commands from a control unit cannot be relayed to a model via a hard wired interface without impeding the measurements to be performed by the spin measurement system, thereby making the system unreliable. In addition, prior art systems are large and have substantial weight and volume.

SUMMARY OF THE INVENTION

An object of the present invention is to provide a receiver/decoder module for a flight deflection measurement system (FDMS) which is miniaturized as an integrated circuit hybrid microchip.

Another object of the present invention is to provide a decoder mounted piggyback on a miniaturized radio controlled receiver, forming an integral unit with the radio controlled receiver.

A further object of the present invention is to provide a decoder having a volume reduced by 70% that of prior art decoders.

It is another object of the present invention is to provide a receiver/decoder module in a (DMS) which functions accurately in a spin measurement system (SMS).

Another object of the present invention is to provide a receiver/decoder module, which can be mounted on a spin model to be used in a spin tunnel, having a reduced weight and volume.

It is a further object of the present invention is to provide a FDMS system having a receiver/decoder module which retains an established control surface actuation function.

The above-mentioned objects of the present invention are obtained by providing a flight deflection measurement system including a hybrid microchip of a decoder and a miniaturized radio controlled receiver means having the decoder mounted piggyback thereon so as to form an integral unit. The decoder includes a decoder means, line driver means, binary counter means, and one-shot multivibrator means. The decoder components are housed within a 0.75 (in) sq.×0.100 H microchip (1.90 cm sq×0.25 cm H). In addition, the microchip has the dimensions of approximately 1.0 (in) Length×1.0 (in) Width×0.02 (in) Height (2.54 cm×2.54 cm×0.5 cm) after final mounting and interfacing is complete. The decoder and receiver together form an integral unit having the dimension 2.06 (in)×1.56 (in)×1.19 (in) (5.23 cm×3.96 cm×3.02 cm) or less. This FDMS can be employed in a wind tunnel to perform a spin measurement and to retain already established control surface actuation functions.

The above-mentioned objects of the invention, together with other objects and advantages, which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Optical flight deflection measurement systems (FDMS) are able to measure the deflection or movement of an aircraft wing relative to the fuselage. In order to implement a proposed spin measurement system (see Cross Referenced U.S. Application No. 07/251/411, filed Sept. 30, 1988, Robert Fodale et al., entitled "Electro-Optical Spin Measurement System"), a small size model for achieving optimum results was developed to be employed in an FDMS system.

In a spin measurement system, a model ("spin model") is suspended in mid air by, for example, a high velocity air stream. The spin model is thrown into the wind tunnel where it floats in a relatively fixed area due to the air flow field. Various aspects of spin on the model can then be studied. The spin model has light emitters (LEDs) located thereon. Receivers are mounted in the wind tunnel so as to obtain various measurements. Because of the models small size and lack of available volume to mount components, a system was developed to perform the desired spin measurement system (SMS) function and also to retain an established control surface actuation function. The control surface actuation function relates to moving the flaps and rudder of the spin model for determining how the model spins under certain conditions in the wind tunnel.

In the spin measurement system which was employed to test the spin model, an eight channel model airplane radio controlled system was selected and included a radio controlled receiver/decoder, an LED target, a battery pack, an antenna and a target. The only available component for miniaturization in the system was the radio controlled receiver/decoder. Therefore, the hybrid microchip of the present invention was developed.

Figure 1:
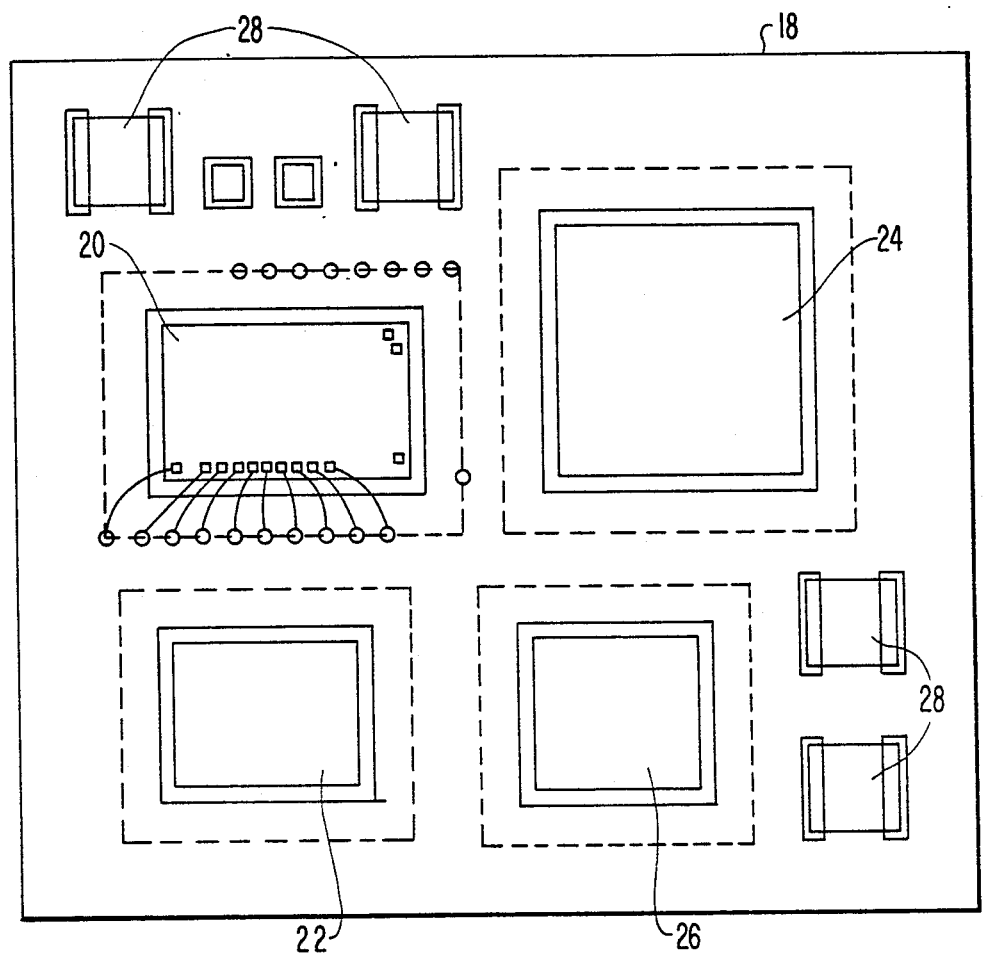
FIG. 1 is a plan view of a hybrid microchip of a decoder according to the present invention.

FIG. 1 is a plan view of the hybrid microchip of a decoder according to the present invention. The decoder 18 includes, for example, decoder means 20, counter means 22, a one-shot multivibrator means 24, and line driver means 26. Various discrete components 28 are also employed. The above-mentioned means are selected and determined in accordance with the characteristics required of the decoder/receiver. Basically, a signal is input to the decoder 18 which is input to the one-shot multivibrator means 24. The multivibrator means 24 is utilized as a missing pulse detector. A gap in a pulse train input exceeding a present duration causes the one-shot multivibrator means 24 to reset the counter means 22 so that synchronized detection of a channel can be accomplished. Outputs from the counter means 22 are then input to the decoder means 20. The decoded outputs are buffered and inverted by means 26 to turn on the LED targets. Commands received from the control unit via the receiver/decoder means 30 flash the LEDs one at a time in sequence. The LEDs are used for their small size and low power requirement. Any suitable light source, however, can be employed.

Figure 2B:
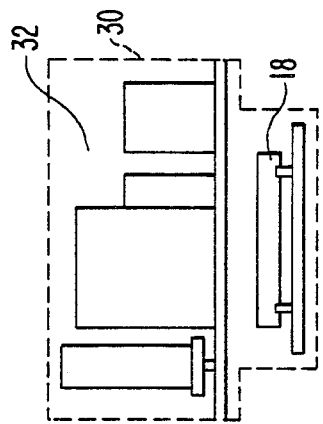
FIG. 2B is a side view of the decoder in FIG. 1 mounted on the receiver, according to the present invention.
Figure 2A:
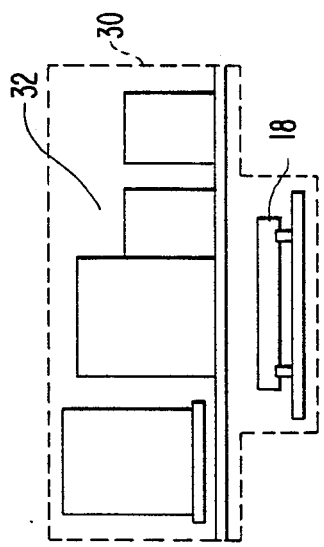
FIG. 2A is a front view of the decoder in FIG. 1 mounted on a receiver, according to the present invention.

Employing a hybrid microchip of the decoder 18 allows the decoder 18 to be mounted on the bottom of a receiver 32 (see FIGS. 2A and 2B). Thus, two modules are located in the same container and form an integral unit. This maintains the small model size so that the SMS function is accurately performed and the already established control surface actuation function is retained. The various means need not be arranged exactly as shown in FIG. 1, but can be arranged in any order most efficient to the design of the receiver/decoder. In addition, the model's ability to spin freely within the wind tunnel is preserved.

Figure 2C:
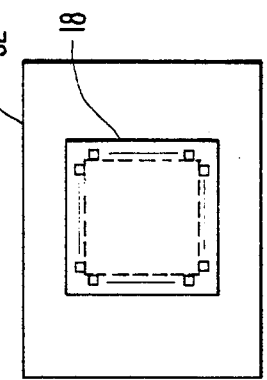
FIG. 2C is a plan view of the actual size of the decoder and receiver according to the present invention.

FIGS. 2A and 2B are, respectively, front and side views of the hybrid receiver/decoder in which the decoder 18 (FIG. 1) is mounted piggyback to the receiver 32 to form an integral unit 30. FIG. 2C is a top view of the actual size of the receiver/decoder.

The decoder's volume is reduced by 70% that of a decoder employing conventional logic components. Therefore, the receiver/decoder can be mounted on the spin model and an SMS function can be accurately performed. Thus, the advantages of the present invention include small size, less weight and volume, and greater reliability than that of prior art devices. Further, the model under test has total aerodynamic freedom.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A flight deflection measurement system including a hybrid microchip, comprising:
   a decoder;
   miniaturized radio controlled receiver means having said decoder mounted piggyback thereon, said receiver means and said decoder forming an integral unit and
   targets;
   said decoder receiving a pulse train and comprising:
   one-shot multivibrator means for detecting a missing pulse in the pulse train;
   counter means, operatively connected to said one-shot multivibrator means, being reset by said one-shot multivibrator means;
   decoder means, operatively connected to said counter means, for turning on the targets; and
   line driver means, operatively connected to said decoder means, for flashing the targets one at time in sequence.

2. A flight deflection measurement system according to claim 1, wherein said integral unit including said decoder and said receiver means has the approximate dimensions 2.06 (in)×1.56 (in)×1.19 (in) (5.23 cm×3.96 cm×3.02 cm) or less.

3. A flight deflection measurement system according to claim 1, wherein said system is employed in a wind tunnel as part of a spin measurement system.

* * * * *